United States Patent [19]

Spitz et al.

[11] Patent Number: 5,212,132
[45] Date of Patent: May 18, 1993

[54] MAGNESIUM CHLORIDE PARTICLES WITH A POLYHEDRAL STRUCTURE, CATALYTIC COMPONENTS SUPPORTED ON THESE PARTICLES, RESULTANT CATALYST SYSTEMS, PROCESSES FOR FABRICATING THESE PRODUCTS, AND POLYOLEFINS OBTAINED FROM THESE CATALYTIC COMPONENTS

[75] Inventors: Roger Spitz, St Symphorien d'Ozon; Thierry Soto, Lyons; Claude Brun, Idron; Laurent Duranel, Arthez de Bearn, all of France

[73] Assignee: Atochem, France

[21] Appl. No.: 796,712

[22] Filed: Nov. 22, 1991

[30] Foreign Application Priority Data

Nov. 29, 1990 [FR] France .................................. 90 14934

[51] Int. Cl.$^5$ .................................................. C08F 4/654
[52] U.S. Cl. ........................................ 502/134; 502/117; 502/126; 502/226; 423/498; 526/125
[58] Field of Search ............... 502/134, 126, 117, 226; 423/498

[56] References Cited

U.S. PATENT DOCUMENTS

| | | | |
|---|---|---|---|
| 3,135,809 | 6/1964 | Bosmajian | 502/103 X |
| 3,591,656 | 7/1971 | Kroll | 502/107 X |
| 4,588,703 | 5/1986 | Cowan et al. | 502/134 X |
| 4,971,937 | 11/1990 | Albizzati et al. | 502/134 X |

FOREIGN PATENT DOCUMENTS

| | | |
|---|---|---|
| 2266706 | 4/1975 | France . |
| 2339574 | 1/1977 | France . |
| 2378046 | 4/1978 | France . |

*Primary Examiner*—Patrick P. Garvin

[57] ABSTRACT

Porous particles of $MgCl_2$ having the form of essentially regular polyhedrons with six or eight faces in which the paired symmetrically opposite faces are essentially parallel, two of which faces are large and elongated and form the top face and the bottom face of a polyhedron such that on each of them the longest diagonal (D) is larger than the shortest distance (d) separating two opposite sides, which large elongated faces are surrounded essentially perpendicularly by the other essentially rectangular faces that form the sides of the said polyhedron, the length of the smaller side (e) of each of the said essentially rectangular faces being less than the shortest distance (d) separating the two opposite sides of the large elongated faces, catalytic components supported on the particles, catalyst systems utilizing the catalytic products, process for making the particles, and polyolefins obtained utilizing the catalytic systems.

23 Claims, 4 Drawing Sheets

MAGNESIUM CHLORIDE PARTICLES WITH A POLYHEDRAL STRUCTURE, CATALYTIC COMPONENTS SUPPORTED ON THESE PARTICLES, RESULTANT CATALYST SYSTEMS, PROCESSES FOR FABRICATING THESE PRODUCTS, AND POLYOLEFINS OBTAINED FROM THESE CATALYTIC COMPONENTS

BACKGROUND OF THE INVENTION

The present invention pertains to particles of preferably anhydrous, magnesium chloride ($MgCl_2$) in a new form as well as the process for their fabrication which overcome the disadvantages of spherical forms of $MgCl_2$. These $MgCl_2$ particles can be employed as catalytic supports, particularly in Ziegler-Natta catalytic components. When these catalytic components are employed as part of a catalyst system in the polymerization of olefins, they preserve the morphology of the support. These catalytic components, catalyst systems utilizing the same are also part of the invention as are the processes for making these products and polyolefins obtained by the use of the catalytic components.

SUMMARY OF THE INVENTION

The $MgCl_2$ in accordance with the invention is constituted of porous particles which have, when viewed under a microscope, the form of essentially regular polyhedrons with six or eight faces in which the paired symmetrically opposite faces are essentially parallel two of which faces are large and enlongated and form the top face and the bottom face of a polyhedron such that on each of them the longest diagonal (D) is larger than the shortest distance (d) separating two opposite sides, which large elongated faces are surrounded essentially perpendicularly by the other essentially rectangular faces that form the sides of the said polyhedron, the length of the smaller side (e) of each of the said essentially rectangular faces being less than the shortest distance (d) separating the two opposite sides of the large elongated faces.

Since the paired symmetrically opposite faces of a polyhedron are essentially parallel, the said faces can therefore be considered to be essentially geometrically identical.

The longest diagnonal (D) of each of the two large elongated faces of a polyhedron is usually from 10 to 100 μm in length. The shortest distance (d) separating two opposite sides of each of these two large faces is usually from 4 to 40 μm in length. The length of the smallest side (e) of each of the other faces forming the polyhedron, which length can also be considered to be the thickness of the $MgCl_2$ particles, is usually from 2 to 20 μm. These particle dimensions are of course combined in a manner such as to respect the definition of the polyhedron and therefore are preferably such that the ratio D/d is from 2 to 7 and the ratio d/e is from 1 to 3.

The invention also comprises the process of making such $MgCl_2$, catalytic components and catalysts utilizing such $MgCl_2$, and polyolefins obtained with catalysts utilizing such $MgCl_2$, all as hereinafter described.

DETAILED DESCRIPTION

Figure 1:
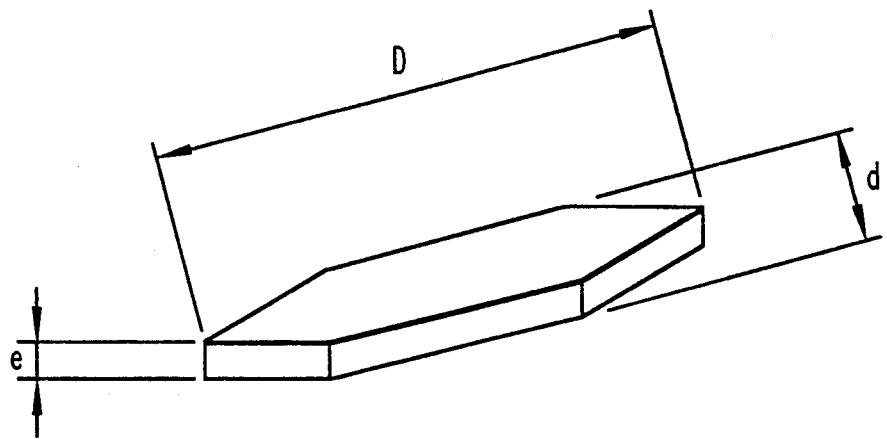
FIG. 1 is a perspective view of an $MgCl_2$ particle in accord with the present invention.

The $MgCl_2$ of the present invention is generally constituted of more than 90%, by number, of particles formed of a mixture of polyhedra as defined with six and eight faces. However, it cannot be excluded that the percentage of particles that do not respond to the definition are in fact residues of strata originating from polyhedra that were more or less broken in handling or agglomerates of particles in accordance with the invention.

The instant $MgCl_2$ particles have low porosity. The porosity can be from 0.1 to 1 $cm^3/g$, preferably from 0.1 to 0.8 $cm^3/g$. Their specific surface is usually from 0.5 to 10 $m^2/g$, preferably from 1 to 3 $m^2/g$.

The mean size of the $MgCl_2$ particles measured by the Malvern technique is generally from 10 to 100 μm, providing a narrow granulometry. The breadth of granulometric distribution expressed as $$\frac{D90}{D10}$$

is usually lower than 15 and more generally lower than 10. D90 is a diameter of which 90% by weight of the particles are smaller and D10 is the diameter of which 10% by weight of the particles are smaller.

The $MgCl_2$ particles are obtained by suspending preferably anhydrous $MgCl_2$ in one of its complexing solvents, with the molar ratio of solvent to $MgCl_2$ being lower than the solubility ratio of these two substances at the temperature of the suspension. In accordance with this procedure, it is therefore indispensable that the $MgCl_2$ remain in suspension in the complexing solvent that is supersaturated with $MgCl_2$. Under these conditions, it is recommended that the medium remain biphasic and such that it contains a sufficient amount of complexing solvent to maintain the $MgCl_2$ in suspension.

"Complexing solvent" as used herein means any chemical compound which is basic in the Lewis base sense and which can form with $MgCl_2$ a complex of defined, stable stiochiometry even in the presence of an excess of the said solvent, and even in the pure solvent.

Tetrahydrofuran is preferably selected from among the solvents that are particularly suitable for fabrication of $MgCl_2$ particles as previously defined.

Under the recommended operating conditions, the formation of the suspension is carried out in the conventional manner by bringing into contact with the complexing solvent, preferably under agitation, $MgCl_2$ of any structure that is preferably anhydrous or of commercial grade preferably with less than 53% water. The MgCl₂ is maintained in suspension for a sufficient period of time, on the order of several hours, for the particles to be deeply swollen by the complexing solvent. In order to obtain the best results, it is recommended that operations during the entire procedure be performed essentially at a temperature between (BP −30° C.) and (BP +40° C.), with BP being the boiling point of the complexing solvent at atmospheric pressure. This treatment allows the rearrangement of the initial $MgCl_2$ particles.

The most obvious phenomena that are produced during the granulometric rearrangement are the disappearance of the fine particles and the large particles of the initial $MgCl_2$ with appearance of a specific form of particles such as previously defined and which have a narrow granulometric distribution.

Once this particle rearrangement operation has been finished, the $MgCl_2$ particles in suspension are separated from the saturated $MgCl_2$ solvent, possibly washed, e.g., with a hydrocarbon, and possibly dried thermally and/or treated under vacuum or chemically to totally or partially eliminate the complexing solvent.

In order to obtain particles with large dimensions, it is recommended, after the particle rearrangement treatment, to subject the particles to a growth treatment. This growth treatment can be comprised of adding to the medium of particles in suspension in the saturated $MgCl_2$ solvent, essentially simultaneously on the one hand a solution of $MgCl_2$ in complexing solvent, which can be identical to or different from that of the initial medium, and on the other hand an inert liquid which is a nonsolvent of $MgCl_2$ and is miscible with the solvent, such as a saturated hydrocarbon. The best results are obtained when the addition is made in a manner such that the ratio of the flow rate of the solution of $MgCl_2$ in the complexing solvent to the flow rate of the inert liquid is constant. This ratio is usually between 20 and 0.2, and preferably between 10 and 0.5.

If necessary, in order to reduce the solubility of the $MgCl_2$ in the initial medium, it is possible to add to the medium of $MgCl_2$ particles in suspension in the saturated $MgCl_2$ solvent, prior to the essentially simultaneous addition of saturated $MgCl_2$ solution and inert liquid, an inert liquid which is a nonsolvent of $MgCl_2$ and miscible with the complexing solvent of $MgCl_2$.

The operation is usually performed between room temperature and 80° C. The volume of $MgCl_2$ solution added to the medium determines the final size of the particles, since the $MgCl_2$ of the added solution crystallized on the initial particles of the medium, thereby increasing their size without changing their morphology.

The $MgCl_2$ recovered is in the form of $MgCl_2$, nX complex, in which X is the solvent of $MgCl_2$ which has complexed it. The value of "n" which represents the molar ratio $$\frac{X}{MgCl_2}$$

can obviously be equal to zero if the solvent was completely eliminated from the $MgCl_2$. This value of "n" usually ranges from 0 to 3. For example, in the specific case in which tetrahydrofuran is used as the complexing solvent, the recommended value of "n" is less than or equal to 2.5. After drying the complex, this value is less than or equal to 1.5.

This $MgCl_2$ in the form of a complex with the "complexing solvent" can be used as is in the case in which it serves as transition-metal support for Ziegler-Natta catalyst components.

For the creation of the $MgCl_2$ suspension, the term complexing solvent is understood to mean not only the use of a single complexing solvent but also the mixture of several of these compounds. It is possible to add to the complexing solvent a miscible compound, which is inert in relation to the complexing solvent, such as a hydrocarbon containing from 6 to 30 carbon atoms and which can be selected from among the saturated or unsaturated, straight or cyclical chain hydrocarbons such as heptane, cyclohexane, toluene, benzene or their derivatives such as durene or xylene or from among compounds with one or more hetroatoms such as the ethers, esters, amines and silanes.

X-ray examination of the $MgCl_2$-based molecular compound shows that it is a crystalline product.

Specifically, the X-ray diffraction spectrum of the compound $MgCl_2$, 1.5 THF (tetrahydrofuran) exhibits the following principal diffraction lines:

| 2 θ position | Relative intensity |
| --- | --- |
| 9.25 | 59.9 |
| 9.50 | 100.00 |
| 16.96 | 15.5 |
| 20.27 | 29.2 |
| 22.45 | 23.76 |
| 24.45 | 15.77 |
| 25.27 | 24.98 |
| 32.19 | 36.57 |
| 32.34 | 19.02 |
| 38.77 | 18.99 |
| 39.77 | 18.53 |

The half-height peak width, characteristic of the size of crystallites, is $0.169 \pm 0.006$ for the line at 9.25 and $1.21 \pm 0.003$ for the line at 9.50.

The measurements were performed with an INEL CPS-160 device, under a voltage of 40 kV and an intensity of 35 mA, using the Kα ray of a copper anticathode and silicon calibration. The INEL spectrum is indexed with the PROLIX computer program and refined in accordance with the PEARSON VII profile.

Because of its original structure, the resultant $MgCl_2$ exhibits the same advantages as $MgCl_2$ in spherical form, but without its disadvantages. Specific sructures of $MgCl_2$ have been pursued in order to endow the $MgCl_2$ with good pourability, measured according to the standard ASTM D 1895, and more specifically to endow the final polymer or copolymer with this quality when the $MgCl_2$ is employed as catalytic support. The spherical form was particularly desired in the case of catalysis so that the final polymer or copolymer particle, essentially reproducing in a homothetic manner the particle of the support, would have this pourability quality. The drawback of this sphericity that it facilitates the accumulation of electrostatic charges in the reactors and conduits, causing, in particular, adhesion of powder to the walls. The structure of the $MgCl_2$ in accordance with the invention makes it possible to reduce this drawback.

A catalytic component of the Ziegler-Natta catalyst type can be obtained essentially by combination of the $MgCl_2$ according to the invention with a transition-metal compound. Thus, this type of component can be obtained by depositing on the MgCl$_2$ a preferably halogenated titanium, vanadium, zirconium and/or hafnium compound, and more specifically TiCl$_4$, TiCl$_3$, TiCl$_n$(OR)$_{4-n}$ with $0 \leq n \leq 3$ and R representing a saturated hydrocarbon radical with 1 to 12 carbons, VCl$_3$, VCl$_4$ or VOCl$_3$, HfCl$_4$ or ZrCl$_4$. This catalytic component associated with a cocatalyst selected from among the organometallic compounds of the Group I-III metals in the periodic table and more specifically the aluminum compounds, functions as a catalyst of the polymerization or copolymerization of straight or branched chain olefins such as ethylene, propylene, butene-1, octene-1, 4-methyl-1-pentene, butadiene-1-3 and 1-9-decadiene.

At least one electron donor can be added to the catalytic component during its fabrication and/or to the cocatalyst. The electron donor can be selected, e.g., from among the Lewis bases, the esters and polyesters of oxygenated acids, the ethers and polyethers, the amines, the silicon compounds such as the silanes and the alkylalkoxysilanes of formula SiR$_1$R$_2$(OR)$_2$, SiR$_1$(OR)$_3$ or SiR$_1$R$_2$R$_3$(OR), in which the various R's are hydrocarbon radicals with 1 to 12 carbons, as well as the phosphorus compounds such as the phosphates and phosphonates, with the preferred compounds being the alkylated esters or polyesters of aromatic acids, the alkyl mono- or diethers, the alkoxysilanes and the alkylalkoxysilanes.

The catalyst obtained from the component fabricated from the MgCl$_2$ of the invention is suitable for all types of polymerization of olefins, high and low pressure, suspension, gas phase and bulk.

The catalytic component obtained from the MgCl$_2$ in accordance with the invention is also constituted of particles which have, when viewed under a microscope, the form of essentially regular polyhedrons with six or eight faces in which the paired symmetrically opposite faces are essentially parallel, two of which faces are large and elongated and form the top face and the bottom face of a polyhedron such that on each of them the longest diagonal (D) is larger than the shortest distance (d) separating two opposite sides, which large elongated faces are surrounded essentially perpendicularly by the other essentially rectangular faces that form the sides of the said polyhedron, the length of the smaller side (e) of each of the said essentially rectangular faces being less than the shortest distance (d) separating the two opposite sides of the large elongated faces.

Figure 2:
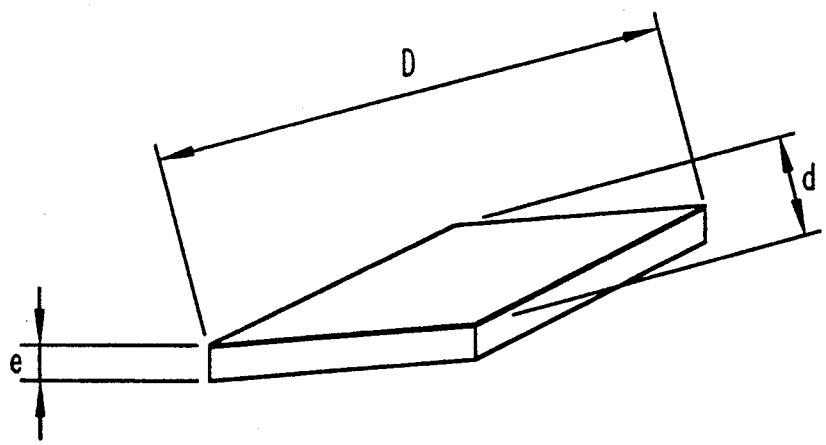
FIG. 2 is a perspective view of an alternate embodiment of an $MgCl_2$ particle in accord with the present invention.

Since the paired symmetrically opposite faces of a polyhedron are essentially parallel, the said faces can therefore be considered to be essentially geometrically identical as shown in FIGS. 1 and 2.

The longest diagonal (D) of each of the two large elongated faces of a polyhedron is usually from 5 to 70 $\mu$m in length. The shortest distance (d) separating two opposite sides of each of these two large faces is usually from 2 to 30 $\mu$m in length. The length of the smallest (e) of each of the other faces forming the polyhedron, which length can also be considered to be the thickness of the particles of the catalytic component, is usually from 1 to 10 $\mu$m. These dimensions of the particles of the catalytic component are of course combined in a manner such as to respect the definition of the polyhedron and therefore are preferably such that the ratio D/d is from 2 to 7 and the ratio d/e is from 1 to 3.

The catalytic component is generally constituted of more than 90% by number of particles formed of a mixture of polyhedra as defined with six and eight faces. However, it cannot be excluded that the percentage of particles that do not respond to the definition are in fact residues of strata originating from polyhedra that were more or less broken in handling.

These particles of the catalytic component have an essentially smooth surface; the porosity of these particles is generally from 0.1 to 1 cm$^3$/g or preferably from 0.2 to 1.5 cm$^3$/g. The specific surface of the catalytic component is usually from 1 to 600 m$^2$/g or preferably from 1 to 50 m$^2$/g.

The mean size of the MgCl$_2$ particles measured by the Malvern technique is generally from 5 to 70 $\mu$m, preferably from 10 to 50 $\mu$m, providing a narrow granulometry. The breadth of granulometric distribution $$\frac{D90}{D10},$$

as previously defined, is usually lower than 15 and more generally lower than 10.

The catalytic component can advantageously be prepared by impregnation, in a known manner, of the previously described MgCl$_2$ particles by a transition-metal compound that is liquid or in solution containing one or more halogen atoms, particularly chlorine. Prior to this impregnation or at the same time, it can be recommended to carry out the depositing of at least one of the previously cited electron donors.

The resultant catalytic component, associated with a conventional cocatalyst, usually selected from among the organaluminum compounds such as the aluminoxanes, the aluminosiloxanes, the compounds with Al—R—Al bonds in which R represents an alkyl group, or the compounds of formula AlXqR's in which X represents Cl or OR' with R' designating a C$_1$ to C$_{16}$, preferably C$_1$ to C$_{12}$, alkyl radical while q and s are numbers such that $1 \leq s \leq 3$, $0 \leq q \leq 2$ with q+s=3, forms a catalyst that is suitable for the polymerization of olefins, more specifically of ethylene, propylene, butene-1, 4-methyl-1-pentene and hexene-1, octene, butadiene-1-3 or their mixtures. It is not excluded that one or more electron donors as previously defined by associated with the cocatalyst. The catalytic component and the cocatalyst are associated in a catalyst system in proportions such that the molar ratio of the aluminum contained in the cocatalyst to the transition metal of the said component is between 0.5 and 2,000, preferably between 1 and 1,000.

Polymerization of the previously cited olefins and, in general, C$_2$ to C$_{12}$ olefins individually or in mixtures by means of the previously defined catalytic system can be carried out in solution or suspension in an inert liquid medium, notably in an aliphatic hydrocarbon such as n-heptane, n-hexane, isohexane or isobutene, or in bulk in at least one of the olefins to be polymerized maintained in the liquid or hypercritical state.

The operating conditions, notably temperatures, pressures and amount of catalytic system, for these liquid-phase polymerization are those conventional for similar cases employing supported or unsupported conventional Ziegler-Natta catalytic systems.

For example, for polymerization performed in suspension or in a solution in an inert liquid medium, one can operate at temperatures up to 250° C. and under pressures ranging from atmospheric pressure to 250 bars. In the case of polymerization in liquid propylene medium, the temperatures can go as high as the critical temperature and the pressure can be between atmospheric pressure and the critical pressure. For bulk polymerization or copolymerization of ethylene for the production of polyethylenes or copolymers that are predominantly ethylene, one can operate at temperatures between 130° C. and 350° C. and under pressures from 200 to 3,500 bars.

The catalytic system obtained by association of the transition-metal component according to the invention with a cocatalyst and possibly an electron donor as described above can also be used for the gas-phase polymerization of the previously cited olefins or mixtures of these olefins. Specifically, gas-phase polymerization, in contact with the said catalytic system, can be performed on a mixture of ethylene or propylene and one or more $C_2$ to $C_{12}$ olefins such as ethylene, propylene, butene-1, hexene-1, 4-methyl-1-pentene and octene-1, containing when in contact with the catalytic system a molar proportion of $C_2$ to $C_{12}$ comonomers between 0.1 and 90%, preferably between 1 and 60%.

Gas-phase polymerization of the olefin(s) in contact with the catalytic system can be performed in any reactor allowing gas-phase polymerization and in particular in an agitated and/or fluidized bed reacator. The conditions for performing the gas-phase polymerization, notably temperature, pressure, injection of the olefin(s) into the agitated and/or fluidized bed reactor and control of the polymerization temperature and pressure, are those conventionally used in the prior art for gas-phase polymerization of olefins. Operations are generally carried out at a temperature lower than the melting point MP of the polymer or copolymer to be synthesized, more specifically between $+20°$ C. and $(MP -5)°$ C., and under a pressure such that the olefin(s), and possibly the other hydrocarbon monomers present in the reactor, are essentially in vapor phase.

Solution, suspension, bulk or gas-phase polymerization can be carried out in the presence of a chain-transfer agent so as to control the melt index of the polymer or copolymer to be produced. The preferred chain-transfer agent is hydrogen, which is employed in an amount that can range up to 90%, preferably between 0.1 and 60%, of the volume of the totality of the olefins and hydrogen brought to the reactor.

The transition-metal component in accordance with the invention can also be used for the preparation of an active prepolymer which can be used alone or in association with a cocatalyst selected from among the previously defined aluminum compounds.

The said active prepolymer is obtained by bringing into contact one or more $C_2$ to $C_{12}$ alpha-olefins with a catalytic system formed by associating the transition-metal component according to the invention with a cocatalyst selected from among the compounds cited above for this purpose and employed in the previously specified proportions, the said $C_2$ to $C_{12}$ olefins being used in an amount representing from 2 to 500 grams, preferably from 2 to 100 grams, of $C_2$ to $C_{12}$ olefin(s) per gram of the transition-metal component.

The catalytic component in accordance with the invention is particularly valuable in the polymerization or copolymerization of ethylene or propylene or their mixtures with each other or with another olefin, in that it makes it possible to obtain polymers or copolymers with narrow granulometry with the absence of fine particles, good pourability and a melt index suitable for the customary applications.

The resultant polyolefins or olefin copolymers are constituted of particles the mean size of which is generally between 100 and 3,000 μm, more particularly between 200 and 2,000 μm. The breadth of granulometric distribution $$\frac{D90}{D10}$$

of the powders is usually lower than 15, and more generally lower than 10, with their apparent density (AD) measured according to the standard ASTM D 1895 method A, being between 0.3 and 0.6 $g/cm^3$, preferably between 0.4 and 0.5 $g/cm^3$. The pourability of the powders is high with values that are usually lower than or equal to 20 seconds measured according to the standard ASTM D 1895. Their specific surface is generally between 0.1 and 20 $m^2/g$. Their porosity is between 0.1 and 1 $cm^3/g$.

The photomicrographs (FIGS. 3 to 7) illustrate the different aspects of the invention.

Figure 3:
FIG. 3 is a photomicrograph of an $MgCl_2$ particle in accord with the present invention in the form of an eight-face polyhedron.

FIG. 3 shows in 2,000× magnification a particle of $MgCl_2$ in the form of an eight-face polyhedron.

Figure 4:
FIG. 4 is a photomicrograph of an $MgCl_2$ particle in accord with the present invention in the form of a six-face polyhedron.

FIG. 4 shows in 6,000× magnification a particle of $MgCl_2$ in the form of a six-face polyhedron.

Figure 5:
FIG. 5 is a photomicrograph of a group of $MgCl_2$ particles in accord with the present invention.

FIG. 5 shows in 150× magnification a group of $MgCl_2$ particles. More than 90% of the $MgCl_2$ particles obtained responded to their definition.

Figure 6:
FIG. 6 is a photomicrograph of a group of $MgCl_2$ particles subjected to growth treatment in accord with the present invention.

FIG. 6 shows in 540× magnification particles that were subjected to growth treatment.

Figure 7:
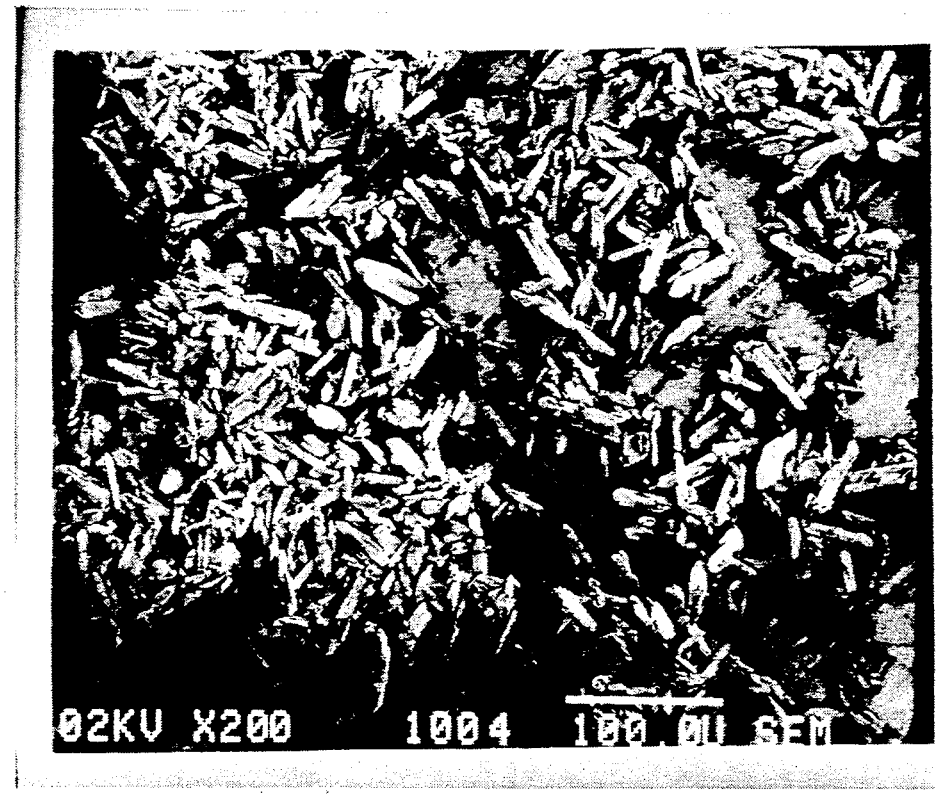
FIG. 7 is a photomicrograph of a group of catalytic component particles in accord with the present invention.

FIG. 7 shows in 200× magnification a group of catalytic component particles.

The measurements of the mean diameters of the particles and the breadth of granulometric distribution $$\frac{D90}{D10}$$

were performed with a Malvern 1600 laser granulometer. The specific surface was determined by the isothermal physical adsorption of nitrogen at the temperature of liquid nitrogen, BET method, on an Quantasorb device. The porous volume was determined by intrusion of mercury under pressure with an Erbascience 1500 porosimeter. The measurements were performed after treatment of the samples under vacuum for 2 hours at room temperature.

The invention will be further described in connection with the following examples which are set forth for further illustration of the invention.

EXAMPLE 1

The following were introduced under nitrogen into a 5-liter reactor with double-jacket thermal control and equipped at its bottom with a filtration plate and a mechanical blade agitator:

(i) 300 g of a commercial anhydrous mangesium chloride, containing 0.3% water with a mean dimension of 2 millimeters, and (ii) 2 liters of tetrahydrofuran (THF).

The agitation was brought to 150 rpm and the temperature was brought to 65° C.

After 7 hours of reaction, the suspension was filtered and the solid recovered after washing with hexane and drying under a nitrogen stream was comprised of 530 g of a granular white solid with good pourability, of molar composition $MgCl_2$, 1.5 THF and with an apparent of 0.59 $g/cm^3$.

Granulometric analysis yielded the following values: mean particle size of 41 μm with a breadth of granulometric distribution expressed by the ratio $$\frac{D90}{D10}$$

of 4.3.

Examination under a scanning electronic microscope showed the particles to have the form of polyhedra with 6 ot 8 faces as illustrated in FIGS. 3 to 5.

EXAMPLE 2

The operating conditions of Example 1 were employed except that the reaction temperature was limited to 50° C. In the same manner, there was obtained 525 g of dry support with an apparent density of 0.6, a mean particle size of 45 μm and a breadth of granulometric distribution of 5.0. The molar ratio of THF to MgCl$_2$ remained at 1.5. The morphology of the particles was retained.

EXAMPLE 3

Example 1 was repeated except that at the end of the reaction, but before filtration, there was slowly added 1 liter of heptane.

The dry solid which was recovered had the following characteristics: apparent density of 0.55, mean aprticle size of 44 μm and a breadth of granulometric distribution of 4.3. The morphology of the particles was retained.

EXAMPLE 4

Example 1 was repeated with the THF replaced by a THF/heptane mixture at 20% by weight of heptane.

The characteristics of the dry solid which was recovered were: apparent density of 0.60 g/cm$^3$, mean particle size of 33 μm and a breadth of granulometric distribution 5.8. The morphology of the particles was retained.

EXAMPLE 5

Example 1 was repeated with the THF replaced by a THF/heptane mixture at 33% heptane. The dry solid had the following characteristics: apparent density of 0.59 g/cm$^3$, particle size of 23 μm and a breadth of granulometric distribution of 6.0. The morphology of the particles was retained.

EXAMPLE 6

Example 1 was repeated with the addition of 45 grams of 1,2,4,5-tetramethylbenzene. After drying, the solid had the following characteristics: apparent density of 0.6 g/cm$^3$, mean particle size of 40 μm and a breadth of granulometric distribution of 5.0. The morphology of the particles was retained.

EXAMPLE 7

Example 1 was repeated with THF replaced by a mixture of THF and tetrahydropyran (THP) at 10% of THP.

The solid recovered after drying had the following characteristics: apparent density of 0.22 g/cm$^3$, mean particle size of 38 μm and a breadth of granulometric distribution 3.7. The morphology of the particles was retained.

EXAMPLE 8

Example 1 was repeated with the addition of 300 g of diisobutyl phthalate (DBP) and 45 g of 1,2,4,5-tetramethylbenzene to the MgCl$_2$ and THF mixture.

After drying, the solid recovered had a molar composition (MgCl$_2$/THF/DBP) of (1/1/0.03). The apparent density was 0.65 g/cm$^3$ and the mean particle size 40 μm with a breadth of granulometric distribution of 5.4. The morphology of the particles was retained.

EXAMPLE 9

Example 1 was repeated. The dry solid recovered was treated again with a solution of triethylaluminum in heptane such that the triethylaluminum concentration was 20% by weight and the aluminum/THF molar ratio was 2. After 2 hours of reaction at 80° C., a solid was recovered which had the following characteristics after drying: apparent density of 0.8 g/cm$^3$, a mean particle size of 30 μm and a breadth of granulometric distribution of 5. The molar ratio of THF to MgCl$_2$ was close to 0. The morphology of the particles was retained.

EXAMPLE 10

Example 1 was repeated. The dry granular solid was fluidized under a nitrogen stream at atmospheric pressure and at a temperature of 150° C. for 4 hours.

The granula solid which was recovered had an apparent density of 0.45 g/cm$^3$ with a mean particle size of 32 μm and a breadth of granulometric distribution of 6. The morphology was retained. The molar ratio of THF to MgCl$_2$ was 0.2.

EXAMPLE 11

To 13.8 g of solid prepared as described in Example 1 were added 30 mL of heptane and 2.5 mL of di-n-butyl phosphate. This was agitated for 2 hours at 100° C. After reaction, 40 mL of pure TiCl$_4$ was added and the reaction was continued for 2 additional hours at the same temperature. At the end, the temperature was reduced to 80° C., the solid was decanted and the supernatant phase was siphoned off. The solid was taken up twice in a solution of TiCl$_4$ in 1-2-dichloroethane at 10% by volume of TiCl$_4$ at 85° C. for 2 hours. After decanting and siphoning, the solid was washed with hexane at room temperature. The catalytic solid was then dried under vacuum at room temperature until a dry powder with good pourability was obtained. Analysis of the solid showed 2.5% titanium, 20% of magnesium and 67.6% of chlorine. Granulometric anlaysis of the catalytic solid showed a mean particle diameter of 32 μm and a breadth defined by the ratio $$\frac{D90}{D10}$$

of 4.0. The morphology of the particles of the catalytic solid was identical to that of the support and as shown in FIG. 7.

EXAMPLE 12

Ten grams of the support prepared in accordance with Example 6 were suspended in heptane to which di-n-butyl phthalate was then added such that the diester concentration was 0.4 M/l and the molar ratio THF/diester was 7.

The reaction was allowed to continue for 3 hours at 80° C. under agitation. The suspension was then filtered after which 100 mL of pure TiCl4 was added and agitation was continued for 2 hours at 90° C. After another filtration, 5 washings were performed with 100 mL of a solution of TiCl4 in 1-2-dichloroethane at 10% by volume of TiCl4; each washing was carried out for 1 hour at 80° C.

After filtration, the solid was washed with hexane and dried under a nitrogen current at 80° C. A yellow-green solid was recovered, analysis of which showed levels of Ti, Mg and Cl of 2.3, 19.5 and 65% by weight, respectively. The mean diameter of the particles was 26 μm and the granulometric breadth was 4.3. The morphology of the particles was comparable to that illustrated in FIG. 7.

EXAMPLE 13

The following were introduced under a stream of gaseous propylene into a 1.5-liter stainless steel reactor equipped with an anchor agitator with magnetic drive and double-jacket thermal control: 1 liter of heptane, 6 mmoles of triethylaluminum and 0.6 mmole of cyclohexyl methyl dimethoxysilane. 15 mg of the catalytic solid prepared in accordance with Example 11 was then introduceed along with 50 ml of gaseous hydrogen. The temperature was brought to 70° C. Gaseous propylene was introduced at the rate of 4 relative bars. During the entire reaction, the pressure of the reactor was maintained by a continuous supply of monomer.

At the end of 90 minutes of reaction, the temperature was reduced to 20° C. and the pressure was reduced to atmospheric pressure.

The polymer, which was insoluble in heptane, was recovered by filtration, dried and weighed. The heptane solution was evaporated so as to recover any possibly solubilized polymer.

The 50.4 grams of granular powder obtained in this manner had very good pourability, a mean particle diameter of 400 μm and a breadth of granulometric distribution of 4.5. 0.6 gram of soluble polypropylene was recovered from the heptane solution. After extraction with the Kumagawa apparatus with heptane of the soluble polymer from the preceding powder, a total index of isotacticity of 97.7% was calculated. The melt index measured according to the standard ASTM D 238 method L was 3.5. The apparent density measured according to the standard ASTM D 1895 method A was 0.40 and the pourability was 18 seconds.

EXAMPLE 14

The following were introduced, in order, at 30° C. into an 8-liter thermostated reactor equipped with a blade agitator and magnetic drive: 2.4 liters of gaseous hydrogen, 6 liters of liquid propylene, 18 mM of triethylaluminum and 1.8 mM of cyclohexyl methyl dimethoxysilane. After a precontact of 10 minutes, 70 mg of the catalytic component described in Example 12 was injected into the reactor. The temperature was brought quickly to 70° C. and maintained at this value for 1 hour.

At the end of the reaction, the reactor was cooled down and the pressure lowered to atmospheric pressure. The 2250 grams of granular solid which were recovered had excellent pourability (17) seconds according to standard ASTM D 1895), a high apparent density 0.47 (standard ASTM D 1895 method A) and an isotacticity index, measured by extraction with heptane of the amorphous polymer with a Kumagawa apparatus, of 97.8% by weight. The melt index of the polymer measured according to standard ASTM D 1238 method L was 2.9.

The polymer had the following characteristics: a mean particle diameter of 900 μm and a breadth of granulometric distribution of 5. The ratio D/d of the majority of particles is between 1.5 and 2.5.

EXAMPLE 15

Example 1 was repeated with the replacement of the THF by a mixture of THF/EDIA (diisoamyl ether) in a 14/1 ratio by volume. The characteristics of the solid recovered were: apparent density of 0.559 g/cm³, mean particle size of 50 μm and a $$\frac{D90}{D10}$$

breadth of granulometric distribution of 5.7. The morphology of the particles was retained.

EXAMPLE 16

Example 1 was repeated with the replacement of the THF by a mixture of THF/PMHS (polymethylhydrogensiloxane) in a ratio of 15/1 by volume.

The characterstics of the solid recovered were: apparent density of 0.5 g/cm³, mean particle size of 37 μm and a $$\frac{D90}{D10}$$

breadth of granulometric distribution of 6.6. The morphology of the particles was retained.

EXAMPLE 17

100 mL of pure TiCl4 was added to 20 g of the solid prepared in accordance with Example 1. Agitation was then carried out for 1 hour at 90° C., followed by eight washings at 80° C. with 50 Ml of a 10/90 by volume mixture of TiCl4/DCE (dichloroethane). After these treatment were finished, washing with 100 cc of hexane was carried out twice. The solid was isolated by filtration and then dried under a nitrogen stream at 50° C.

Analysis of the catalytic solid showed a Ti content of 3.8%, a Mg content of 61.2% and a Cl content of 61.2%. The mean diameter of the particles of the catalytic solid was 27 μm and the breadth of granulometric distribution was 3.9.

EXAMPLE 18

The following were introduced at 40° C. under a nitrogen stream into the reactor described in Example 13:1 liter of hexane, 6 mM of triisobutylaluminum and 20 mg of the catalyst obtained in accordance with Example 17. The nitrogen pressure was raised to 2 bars of total pressure and the temperature was brought to 80° C. When temperature equilibrium was reached, the pressure was adjusted to 3 bars by supplying nitrogen. Four relative bars of hydrogen and six bars of ethylene were added. The pressure was maintained constant at 13 bars absolute by adding ethylene.

At the end of 120 minutes of reaction, the temperature was decreased to 40° C. and the reactor was decompressed to atmospheric pressure. After filtration and drying, 646 g of polymer were recovered.

The productivity was 22,275 g of PE/g of catalyst and the mean particle diameter of the powder was 542 microns for an apparent density of 0.319 g/cm³.

The melt indices at 190° C. under loads of 2.16 kg and 5 kg were 0.7 and 4.68, respectively.

EXAMPLE 19

Operations were performed as in Example 18 except that 20 mg of the catalyst prepared in Example 11 was introduced.

The polyerization reaction was continued for 180 minutes and 405 g of polyethylene was recovered at the end of the reaction, i.e., a productivity of 20,250 g of polymer ws 521 microns for an apparent density of 0.311 g/cm³.

The melt indices at 190° C. under loads of 2.16 kg and 5 g were 0.87 and 2.85, respectively.

EXAMPLE 20 a) Synthesis of a prepolymer

The following were introduced under a nitrogen stream at 40° C. into a reactor of the same type as was used in Example 13:
0.8 liter or dry hexane
14 mM of THA (trihexylaluminum)
1 g of the catalyst obtained in Example 11
One then introduced:
2 relative bars of hydrogen
A controlled flow of ethylene was then introduced in accordance with the following schedule:
1.2 L/h for 30 minutes
2 L/h for 30 minutes
4 L/h for 30 minutes
8 L/h for 30 minutes
16 L/h for 30 minutes
30 L/h for 130 minutes The reactor was decompressed and the hexane was evaporated under a nitrogen stream at 70° C. The 94 g of prepolymer that was collected had a degree of prepolymerization of 94 g of PE/g of catalyst.

b) Gas-phase synthesis of a high-density polyethylene (HDPE)

Operations were performed in a dried 8.2-liter, thermostated reactor equipped with agitation in the presence of 20 g of a dispersant charge of polyethylene originating from an identical prior test.

Into this reactor, which was maintained at 90° C. during the entire polymerization, under agitation of 400 rpm and a vacuum of 1.33 Pa, hydrogen was injected until reaching a pressure of 6 bars absolute. Eight bars of ethylene were then injected into the reactor until reaching partial pressures of hydrogen and ethylene of 6 and 8 bars absolute, respectively.

After these injections, 4 g of the active prepolymer prepared above was injected by nitrogen pressure; the injection of nitrogen was continued until the total pressure inside the reactor reached 21 bars absolute. The pressure was maintained at this level by injection of ethylene. After 120 minutes of reaction, the polymerization was stopped by decompression of the reactor which was then purged with nitrogen and allowed to cool.

Including the initial charge, 369 g HDPE powder was recovered. The productivity was 7,920 g of PE/g of catalyst. The powder had a mean particle diameter of 495 microns and an apparent density diameter of 495 microns and an apparent density of 0.359 g/cm³. The melt indices under loads of 2.16 kg and 5 kg were 4.55 and 14.6, respectively.

c) Gas-phase systhesis of an ethylene/butene-1 copolymer

Operations were carried out in a dried 8.2-liter, thermostated reactor equipped with blade agitation in the presence of 20 g of polyethylene powder originating from an idential prior test. Into this reactor, maintained at 85° C. during the entire polymerization, under agitation of circa 400 rpm and a vacuum of 1.33 Pa, was injected butene-1 until a pressure of 1 bar absolute was reached. The injection of butene-1 was continued until the pressure had climbed to 1.5 bars absolute.

One then injected successively into the reactor 1 bar of hydrogen and 4.5 bars of ethylene until reaching partial pressures of hydrogen and ethylene of 1 and 1.5 bars, respectively. After these injections, 3 g of active prepolymer was introduced by nitrogen pressure with the injection of nitrogen being continued until the total pressure inside the reactor reached 21 bars absolute. The pressure was maintained at this value by the introduction of butene-1/ethylene in a molar ratio of 0.0466. After 120 minutes of reaction, the polymerization was stopped by decompression of the reactor, which was then purged with nitrogen and allowed to cool.

Including the initial charge, 372 g of ethylene/butene-1 copolymer was obtained. The productivity was 11,00 g of PE/g of catalyst and the density was 0.918 g/cm³. The powder had a mean particle diameter of 407 microns and an apparent density of 0.290 g/cm³. The melt indices at 190° C. under loads f 2.16 kg and 21.6 kg were 1.35 and 47.1, respectively.

EXAMPLE 21

The following were added at 80° C. under agitation of circa 100 rpm to a 1-liter reactor equipped with an agitator and a coolant-circulation double-jacket temperature control:
1.3M of anydrous MgCl₂
0.098M of durene
9M of THF Agitation was performed for 1.5 hours at 100 rmp and then for 2.5 hours at 250 rpm.

The suspension was transferred to a Schlenk tube. An aliquot of this suspension was filtered and washed with hexane for analysis of the solid (S1) obtained.

The reactor was charged with an aliquot of the suspension obtained, which contained 90 mM of MgCl₂, 623 mM of THF and 6.78 mM of durene. Under agitation of circa 150 rpm at a temperature of 60° C., an equivalent volume of hexane was added over 30 minutes.

Continuing the agitation, the following were added simultaneously over 2.5 hours at 60° C.;
a 514-mL flow of a saturated solution at 60° C. of MgCl₂ in THF containing 20 g of MgCl₂, and
a 514-mL flow of hexane.

At the end of growth, the suspension was cooled to room temperature and then filtered. The support was washed three times with 500 mL of hexane and dried at 50° C. under a nitrogen stream. The support (S2) was transferred to a Schlenk tube under nitrogen. 58 g of MgCl₂, 1.5 THF complex was isolated.

| Ref. Support | D90 | Mean diameter | D10 | $\frac{D90}{D10}$ |
|---|---|---|---|---|
| S1 | 94.1 | 49.55 | 17.28 | 5.4 |
| S2 | 111.6 | 60.4 | 23.43 | 4.8 |

Viewed under a scanning electron microscope, the particles had the appearance shown in FIG. 6.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Porous particles of $MgCl_2$ having the form of essentially regular polyhedrons with six or eight faces in which the paired symmetrically opposite faces are essentially parallel, two of which faces are large and elongated and form the top face and the bottom face of a polyhedron such that on each of them the longest diagonal (D) is larger than the shortest distance (d) separating two opposite sides, which large elongated faces are surrounded essentially perpendicularly by the other essentially rectangular faces that form the sides of the said polyhedron, the length of the smaller side (e) of each of the said essentially rectangular faces being less than the shortest distance (d) separating the two opposite sides of the large elongated faces.

2. The particles of claim 1, wherein the paired symmetrically opposite faces are geometrically essentially identical.

3. The particles of claim 2, where in the ratio (D)/(d) is between 2 and 7.

4. The particles of claim 3, wherein the ratio (d)/(e) is between 1 and 3.

5. The particles of claim 4, wherein (D) is between 10 and 100 μm, (d) is between 4 and 40 μm, and (e) is between 2 and 20 μm.

6. The particles of claim 5, wherein their porosity is between 0.1 and 1 cm$^3$/g.

7. The particles of claim 6, wherein their specific surface is between 0.5 and 10 m$^2$/g.

8. The particles of claim 7, wherein the size of the particles is between 10 and 100 m with a breadth of granulometric distribution $$\frac{D90}{D10}$$

less than 15.

9. The particles of claim 8, wherein the $MgCl_2$ is in the form of a $MgCl_2$, nX complex in which X is the solvent of $MgCl_2$ with which it is complexed, with n being such that the amount by weigh t of solvent complexed with the $MgCl_2$ allows the complex to retain its crystalline form.

10. The particles of claim 9, wherein n has a value between 0 and 3.

11. The process of making porous $MgCl_2$ in crystalline form of essentially six or eight face polyhedrons comprising suspending $MgCl_2$ in at least one of its complexing solvents with the molar ratio of the solvent to $MgCl_2$ being lower than the solubility ratio of these two substances at the temperature of the suspension.

12. The process of claim 11, wherein the suspension is a biphasic medium such that it contains an amount of complexing solvent that is sufficient to maintain the $MgCl_2$ in suspension.

13. The process of claim 12, wherein the suspension is maintained essentially at the boiling point of the complexing solvent without dropping more than 30° C. below this boiling point.

14. The process of claim 13, wherein in order to increase the size of the particles without changing their morphology, there is added essentially simultaneously to the suspension a solution of $MgCl_2$ in a complexing solvent and an inert liquid which is a nonsolvent of $MgCl_2$ and is miscible with the complexing solvent.

15. A catalytic component consisting essentially of particles of $MgCl_2$ impregnated by a transition-metal compound and up to an effective amount of an electron donor, wherein said particles have the form of essentially regular polyhedrons with six or eight faces in which the paired symmetrically opposite faces are essentially parallel, two of which faces are large and elongated and form the top face and the bottom face of a polyhedron such that on each of them the longest diagonal (D) is larger than the shortest distance (d) separating two opposite sides, which large elongated faces are surrounded essentially perpendicularly by the other essentially rectangular faces that form the sides of the said polyhedron, the length of the smaller side (e) of each of the said essentially rectangular faces being less than the shortest distance (d) separating the two opposite sides of the large elongated faces.

16. The catalytic component of claim 15, wherein the paired symmetically opposite faces are geometrically essentially identical.

17. The catalytic component of claim 16, wherein the ratio $$\frac{(D)}{(d)}$$

is between 2 and 7.

18. The catalytic component of claim 17, wherein the ratio $$\frac{(d)}{(e)}$$

is between 1 and 3.

19. The catalytic component of claim 18, wherein (d) is between 5 and 70 μm, (d) is between 2 and 30 μm, and (e) is between 1 and 10 μm.

20. The catalytic component of claim 19, wherein the porosity of its particle is between 0.1 and 2 cm$^3$/g.

21. The catalytic component of claim 20, wherein its specific surface is between 1 and 600 m$^2$/g.

22. The catalytic component of claim 21, wherein the size of its particles is between 5 and 70 m with a breadth of granulometric distribution $$\frac{D90}{D10}$$

lower than 15.

23. A catalytic system for the polymerization of olefins consisting essentially of a catalytic component of anyone of claims 15 to 22 and a cocatalyst consisting essentially of a organoaluminum compound.

* * * * *

UNITED STATES PATENT AND TRADEMARK OFFICE
CERTIFICATE OF CORRECTION

PATENT NO. : 5,212,132

DATED : May 18, 1993

INVENTOR(S) : Spitz, et al

It is certified that error appears in the above-indentified patent and that said Letters Patent is hereby corrected as shown below:

Column 11, line 46, before "238" insert "1".

Column 14, line 34, correct "f" to read "of".

Signed and Sealed this

Fourth Day of January, 1994

Attest:

BRUCE LEHMAN

*Attesting Officer*  *Commissioner of Patents and Trademarks*